US006729671B2

(12) United States Patent
Keles

(10) Patent No.: US 6,729,671 B2
(45) Date of Patent: May 4, 2004

(54) DEVICE FOR THE CONVERSION OF THE INTERIOR SPACE OF A VEHICLE

(76) Inventor: Annette Lily Keles, Wolfachstr. 37, Backnang (DE), 71522

( * ) Notice: Subject to any disclaimer, the term of this patent is extended or adjusted under 35 U.S.C. 154(b) by 0 days.

(21) Appl. No.: 10/169,389

(22) PCT Filed: Dec. 16, 2000

(86) PCT No.: PCT/DE00/04520

§ 371 (c)(1),
(2), (4) Date: Jun. 28, 2002

(87) PCT Pub. No.: WO01/51316

PCT Pub. Date: Jul. 19, 2001

(65) Prior Publication Data

US 2003/0107230 A1 Jun. 12, 2003

(30) Foreign Application Priority Data

Dec. 23, 1999 (DE) .......................... 199 62 490
Apr. 5, 2000 (DE) .......................... 100 16 946

(51) Int. Cl.$^7$ ............................................. B60R 13/01
(52) U.S. Cl. ............ 296/39.2; 296/39.1; 296/214; 296/24.1
(58) Field of Search ................... 296/39.1, 39.3, 296/37.1, 37.5, 37.6, 24.1, 214, 39.2; 105/423

(56) References Cited

U.S. PATENT DOCUMENTS

| 1,262,025 A | * | 4/1918 | Dickson | 105/423 |
| 1,419,085 A | * | 6/1922 | Unser | 105/423 |
| 3,393,936 A | * | 7/1968 | Hall | 296/24.1 |
| 3,653,710 A | * | 4/1972 | Barnard | 296/39.1 |
| 4,077,418 A | * | 3/1978 | Cohen | 135/95 |
| 4,461,402 A | * | 7/1984 | Fell et al. | 222/105 |
| 4,736,762 A | | 4/1988 | Wayman | |
| 4,877,281 A | * | 10/1989 | Altmann | 296/39.1 |
| 4,917,431 A | * | 4/1990 | McDonald | 296/39.1 |
| 5,040,693 A | * | 8/1991 | Podd et al. | 220/1.5 |
| 5,378,034 A | * | 1/1995 | Nelsen | 296/39.2 |
| 5,419,602 A | * | 5/1995 | VanHoose | 296/39.1 |
| 5,570,921 A | * | 11/1996 | Brooker | 296/39.1 |
| 5,806,909 A | * | 9/1998 | Wise | 296/39.1 |
| RE36,214 E | * | 6/1999 | Podd et al. | 220/1.5 |
| 5,927,785 A | * | 7/1999 | Cantrell | 296/39.1 |
| 6,142,550 A | * | 11/2000 | Blyth et al. | 296/39.2 |
| 6,203,089 B1 | * | 3/2001 | Doolittle et al. | 296/39.1 |

FOREIGN PATENT DOCUMENTS

| FR | 2001328 A | * | 9/1969 | |
| GB | 2115754 A | * | 9/1983 | B60R/27/00 |

* cited by examiner

Primary Examiner—Dennis H. Pedder
Assistant Examiner—Patricia L. Engle
(74) Attorney, Agent, or Firm—Barber Legal; Craig W. Barber

(57) ABSTRACT

A removable liner for the flexible conversion of a car, van or minibus into a robust all-purpose carrier. The entire space available within the vehicle for load transportation is hermetically encapsulated by being lined with an abrasion-resistant, particularly lightweight and elastic material specifically developed for this purpose. The liner consists of a floor having adjoining side parts to half the height of the interior space of the vehicle, the roof lining with adjoining side parts to half the height of the interior space of the vehicle and the front and rear flaps. The liner can be folded together, the side parts first being folded together onto the floor from left and right. The roof lining then automatically lies on the side parts. The front and rear flaps close off the folded-together container, so that a lightweight, compact and portable package is formed.

10 Claims, 5 Drawing Sheets

DEVICE FOR THE CONVERSION OF THE INTERIOR SPACE OF A VEHICLE

CROSS-REFERENCE TO RELATED APPLICATIONS

This application is the national phase of International Application No. PCT/DE 00/04500 and has claimed the priority date of Dec. 23, 1999, per Form PTO-1390.

FIELD OF THE INVENTION

The invention relates generally to a vehicle, and specifically to a device for the conversion of the interior space of a vehicle.

STATEMENT REGARDING FEDERALLY FUNDED RESEARCH

This invention was not made under contract with an agency of the US Government, nor by any agency of the US Government.

BACKGROUND OF THE INVENTION

U.S. Pat. No. 5,570,921 has disclosed a device for the transportation of goods, with a liner which comprises at least a floor and two side parts and can be folded up, the side parts being approximately perpendicular to the floor in the position of use of the liner.

SUMMARY OF THE INVENTION

The invention is a removable liner for the flexible conversion of a car, van or minibus into a robust all-purpose carrier. Vehicles such as stretch limousines, vans and minibuses are used primarily for transportation of passengers. On the other hand, these vehicles have so much interior space that if adequate protection of the interior space of the vehicles could be ensured, they could be used for transporting any desired type of load. Commercially available trays and similar containers do not offer sufficient protection for such vehicles and can therefore be used only in certain cases.

The entire space available within the vehicle for load transportation is hermetically encapsulated by being lined with an abrasion-resistant, particularly lightweight and elastic material specifically developed for this purpose. The liner consists of a floor having adjoining side parts to half the height of the interior space of the vehicle, the roof lining with adjoining side parts to half the height of the interior space of the vehicle and the front and rear flaps. The liner can be folded together, the side parts first being folded together onto the floor from left and right. The roof lining then automatically lies on the side parts. The front and rear flaps close off the folded-together container, so that a lightweight, compact and portable package is formed.

DETAILED DESCRIPTION

Figure 1:
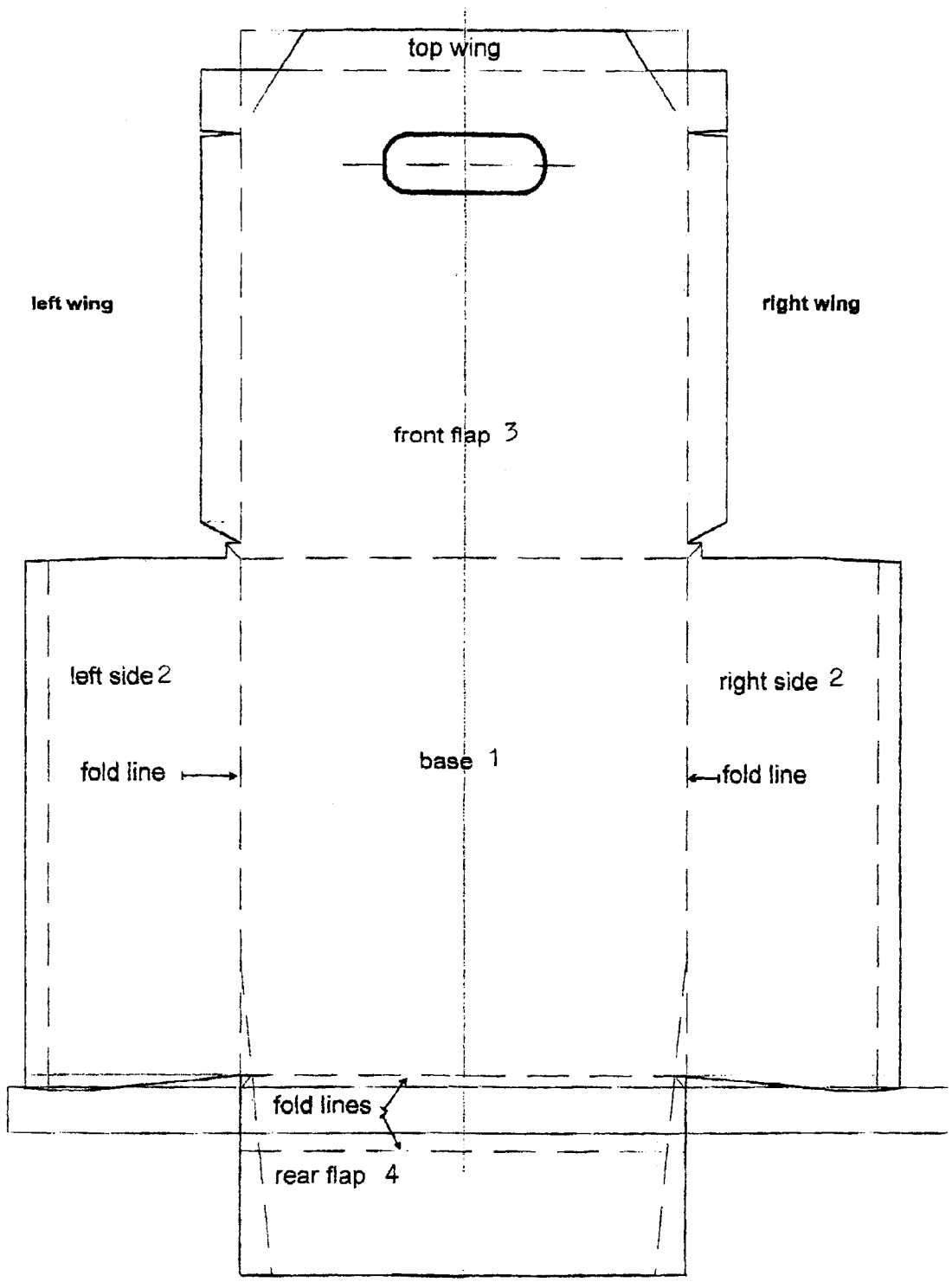
FIG. 1 is a plan view of component 1 of the first embodiment of the invention unfolded.

In the attached drawings, solid lines indicate permanent connections, dashed/dotted lines indicate flexible connections. Arrows indicate directions of rotation.

The invention relates to a flexible container which permits a reversible conversion of a car, van or minibus into a robust all-purpose carrier. The use of such a vehicle—as an all-purpose carrier—results from the fact that the entire interior space of the vehicle, which is available for transportation, is hermetically encapsulated, so that no dirt or dust can escape from the encapsulated space into the remainder of the vehicle. As the result of the use of special mechanics and kinematics adapted to the interior contours of the vehicle, said vehicle is made available in a few tens of seconds for general transportation functions.

As a result of hermetic encapsulation of the entire load space, an expanded or new potential range of uses is created for cars, station wagons, vans, minibuses and multipurpose vehicles (MPVs), which vehicles being converted into robust all-purpose carriers. As a result of the invention, a vehicle of one of said types, which is intended primarily for the transportation of passengers, can be employed for heavy-duty purposes without being exposed to the risk of being soiled or damaged, such uses including the disposal and transportation of goods such as wet, dirty and bulky articles, building materials, rubble, earth and timber, and for the storage and transportation of tools, small machines, cases and working materials (including greasy, oily and chemical substances).

For such requirements, it is usual to employ car trailers, which are fitted with trailer couplings, or special vehicles designed for transporting such materials, such as panel trucks and vans. The invention therefore largely takes over the functions of the car trailers, which because of their inconvenience are used only reluctantly, and in some cases vans and panel trucks.

Use is made of a new composite material specifically developed for said functions, which is strong and unusually lightweight and is notable for particular rigidity, high elasticity, high abrasion resistance and unusual energy absorption capacity. As a result of this high energy absorption capacity of the material used, not only is protection provided against soiling of the interior space of the vehicle but hazard sources and hazard potentials, which can arise in many ways during the transportation of heavy and bulky articles, are reduced or completely eliminated. In addition, not only the interior walls of the vehicle but also the vehicle tailgate are reliably protected.

The conversion of a vehicle into an all-purpose carrier and its reconversion to its initial state can, as has been demonstrated in practical application on various prototypes, be effected by a man or woman within 10 seconds by means of a few manipulations.

The invention may be embodied in many different ways. The container may be assembled from components and be of collapsible design. The components may be connected to one another permanently or removably. The connection of the components can be effected by various methods and techniques. For example, a large part can be divided into subcomponents by means of fold lines, which subcomponents remain and integral part of the original part, or separate parts can be permanently connected to one another by means of adhesive tapes and combined to form a whole.

In the case of longer vehicles, such as buses, for example a Mercedes Sprinter, the available space can be subdivided lengthwise into segments and the modules for the various segments connected to one another flexibly or permanently.

A flexible conversion of an automobile, especially a stretch limousine, a van or a minibus, into a robust all-purpose carrier is a conversion wherein the entire space of the vehicle available for the transportation of loads is hermetically encapsulated by being lined with an abrasion-resistant material.

The liner material is pressed against the interior walls, the floor and the roof of the vehicle by utilizing its resilience and rigidity. The resilience is created in that the liner material is placed under tension or is kept under tension for the duration of use.

The liner article consists of components that are permanently assembled or can be dismantled.

The liner article for the hermetic encapsulation of the load space, if its components are permanently assembled, consists of one part that can be folded together and swung out.

In order to achieve a particularly lightweight material with the necessary rigidity, elasticity and high abrasion resistance, foams such as polyethylene and polypropylene are laminated with sheet materials such as polyester, rigid PVC and polycarbonate.

In order to keep the resilience low with some materials such as polypropylene or polycarbonate sheets, certain pre-shaping operations are carried out. In the case of materials which offer the necessary rigidity and strength, the resilience of the material may be dispensed with.

Two examples of embodiment, which have been built and tested as prototypes, are illustrated in the drawings and are described in detail below. In the first embodiment, the permanent connection is effected in that two large, independent parts are subdivided into subcomponents by thermoforming. Thereafter, these two parts are connected, so that a single part is formed. In the second embodiment, separate parts are connected to one another by means of adhesive tapes and combined to form a unit.

Figure 2:
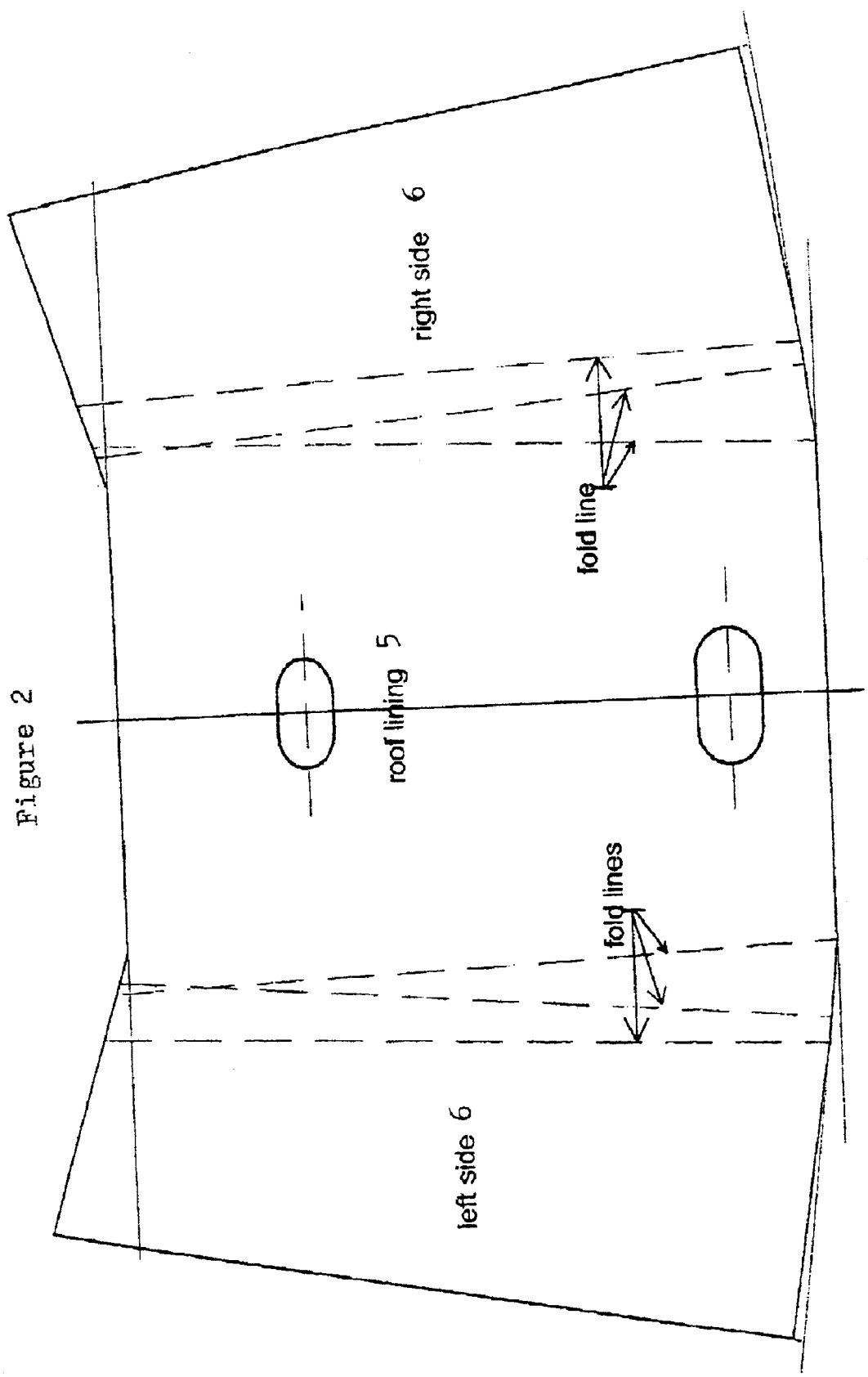
FIG. 2 is a plan view of component 2 of the first embodiment of the invention unfolded.

Embodiment 1: This embodiment consists of two parts, which are divided into subcomponents by thermoforming in an edging machine (FIG. 1, FIG. 2). The two main parts are then connected to one another by means of hot-melt adhesive tapes.

The first principal component (component 1) comprises, after the production of the fold lines, the following subcomponents (FIG. 1):
1. base
2. sides (right and left, up to half of the base)
3. front flap with wings (right, left and top)
4. rear flap.

The fold line between each of the right-hand and left-hand sides and the floor extends in the longitudinal direction while the fold line between each of the front and rear flaps and the floor extends in the transverse direction. The front flap is additionally provided with three fold lines, as a result of which three foldable wings are formed.

The second principal component (component 2) comprises, after the production of the fold lines, the following subcomponents (FIG. 2):

5. roof lining
6. sides (right and left, up to half of the roof).

The fold line between each of the right-hand and left-hand sides and the roof extends in the longitudinal direction. These two fold lines are parallel to the fold lines of the sides of component 1.

The subcomponents, 1–4 and 5–6 respectively, result from fold lines that are produced by thermoforming. The container which is described here can also be produced, instead of from two large components, from six separate, correspondingly smaller components, which are permanently connected to one another. The connecting lines between the six components then simultaneously serve as fold lines.

Figure 3:
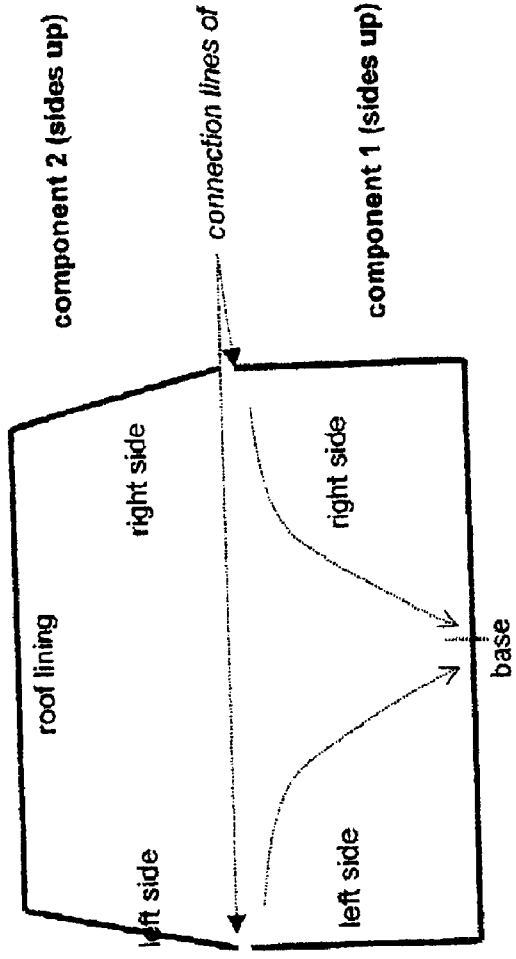
FIG. 3 is an end view of components 1 and 2 of the invention shown being connected together in assembly.

The component 1 and the component 2 are connected to one another along the left-hand and right-hand sides, bordering in each case the floor and the roof lining, by means of Hot-melt adhesive tapes. These connecting lines are additional fold lines, which serve for the folding-up of component 2 onto component 1 (FIG. 3).

Figure 4:
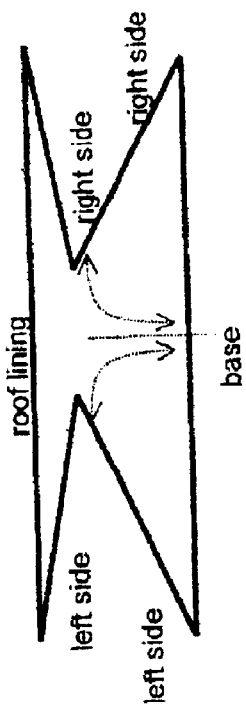
FIG. 4 is an end view of the invention during folding for storage.
Figure 5:
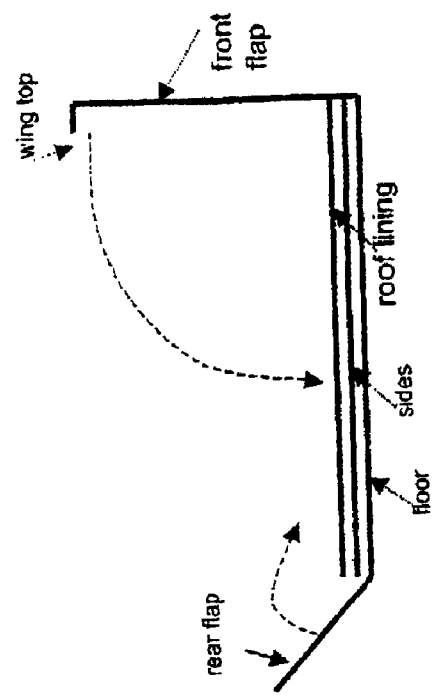
FIG. 5 is a side view of the invention during folding.

On the floor (component 1), the associated side parts are folded inward about their respective fold lines, so that the right-hand and left-hand sides meet at the center line of the floor (FIG. 4). As the component 1 and the component 2 are connected to one another along their side parts, the side parts of the component 2 fall upon the side parts of the component 1. The right-hand and left-hand sides of the component 2 also necessarily meet at the center line of the floor (FIG. 4). The roof lining, which is the connecting member between the side parts, thus rests flat. The front flap is folded down onto the roof lining and underlying side parts and floor (FIG. 5). Similarly, the shorter, rear flap comes from behind and covers the remainder that has not been covered by the front flap.

The folded-together container is introduced into the vehicle from behind in the longitudinal direction. The rear flap is folded back (FIG. 5). The three wings of the front flap are opened up and the front flap is folded upward so that it stands vertically on the floor and extends up to the roof lining of the vehicle (FIG. 5). The sides which will border the floor and roof lining, respectively, are pressed away from the center line of the floor toward the interior wall of the vehicle, as a result of which the roof lining lifts away upward and presses against the upper wing of the front flap or against the roof of the vehicle (FIG. 4, FIG. 5). The container is now fully erected. The two side wings of the front flap are pressed from outside onto the side parts and secured. The all-purpose carrier is ready to be loaded.

Embodiment 2: This embodiment consists of a container assembled from a plurality of components, the components being permanently connected to one another in a manner such that they are foldable. In this embodiment, hot-melt adhesive tapes have been used to connect the components.

The components from which a container is assembled are:
11. floor
12. side parts
13. mounting part (roof lining)
14. flaps (front and rear)
15. wings (side and top)

Figure 6:
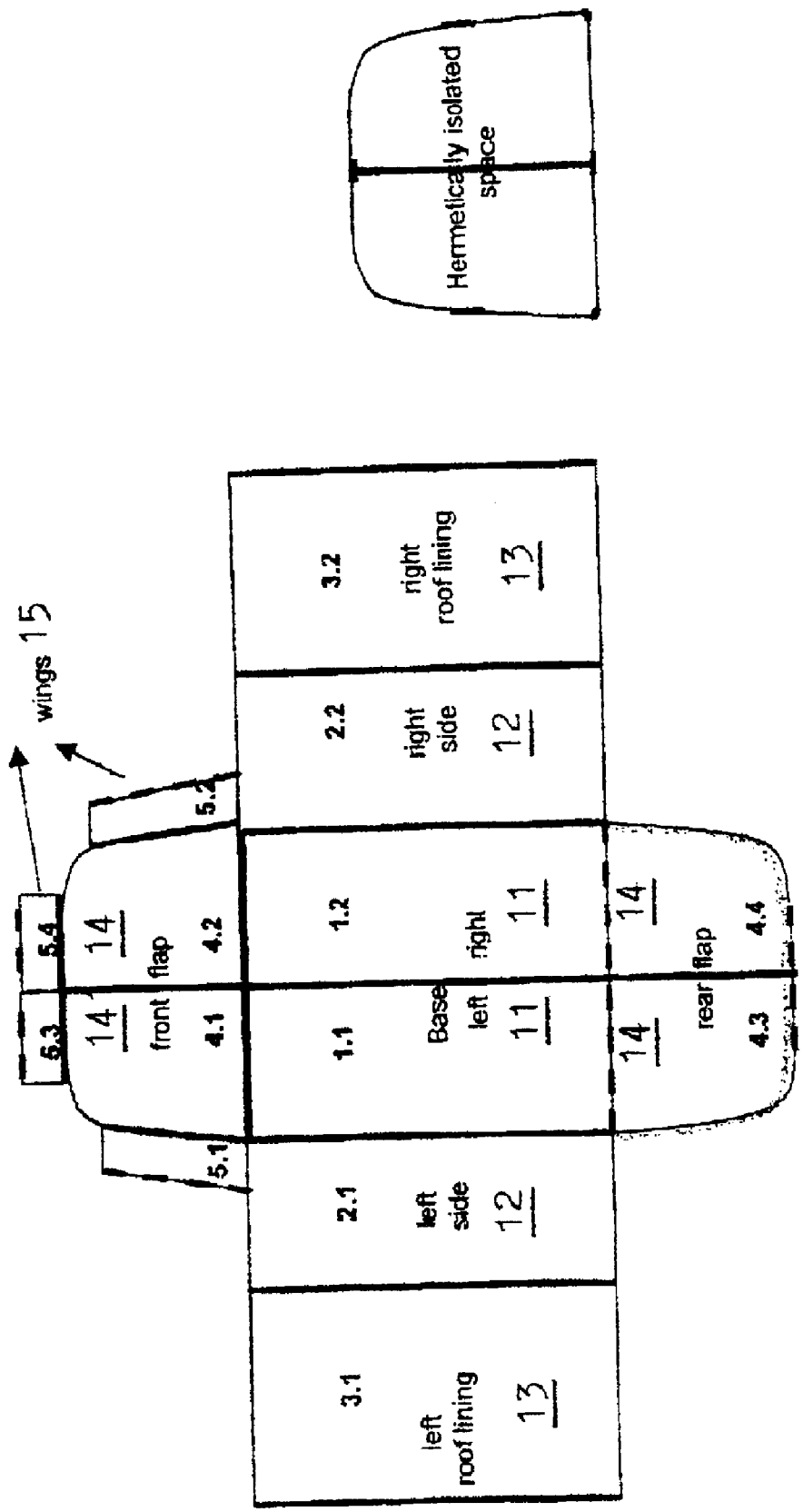
FIG. 6 is a plan view of a second embodiment of the invention.

Each of these components, in turn, may consist of one or more subcomponents. The components of the embodiment to be described here are divided up as follows:
two-part, cohesive floor assembly (FIG. 6—1.1; 1.2)
two single-part side parts for left and right (2.1; 2.2)
two-part, cohesive mounting part (3.1; 3.2)
one two-part flap for the front (4.1; 4.2) extended by two single-part side wings for left and right (5.1; 5.2) and two-part top wing (5.3; 5.4)
one two-part flap without wings for the rear (4.3; 4.4)

The floor assembly (FIG. 6—1.1; 1.2) thus consists of two parts, which are bonded together at the center in the longitudinal direction of the vehicle, so that they can be folded together at the point of intersection. This point of intersection, which forms the central axis of the container base, precisely overlaps with the central axis of the floor of the vehicle load space. All components of the container are mutually symmetrical relative to the central axis.

The side parts (2.1, 2.2), which in the position of use of the container are perpendicular to the floor assembly (1.1; 1.2), are adhesively bonded together with the floor assembly in the longitudinal direction of the vehicle, so that when the container is folded together they are swung from both sides onto the floor assembly.

The two components of the mounting part (3.1; 3.2), which are placed on the side parts (2.1; 2.2), are adhesively bonded to one another at the central axis of the cover of the load space and, at the bottom, to the two side parts in the longitudinal direction of the vehicle. They are foldable at the central axis of the cover. The mounting part, in the position of use, covers the interior walls left over above the side parts, and the whole cover of the load space of the vehicle.

When the container is folded together, the mounting part, folded together at the central axis of the cover, falls with its components onto one of the side parts, which already lie symmetrically on the floor assembly, the common edges between the mounting part and the side parts (2.1/3.1; 2.2/3.2) meeting at the central axis of the floor assembly, coming from left and right, while the central axis of the mounting part tends outward, where the two common edges between the floor assembly and the side parts (1.1/2.1; 1.2/2.2) come together.

In order to prevent contact between the common edges—side parts, mounting parts (2.1/3.1; 2.2/3.2)—at the central axis of the floor assembly and to create space for convenient folding-up of the container about the central axis of the floor assembly, the height of the side parts is a few cm less than the width of the components of the floor assemblies.

Because all parts, including the components of the mounting part (3.1; 3.2) are adhesively bonded together in the longitudinal direction of the vehicle, the embodiments discussed hitherto result in a container which, in the assembled state, has the configuration of a tunnel. A flap, which closes the front aperture of the tunnel on the driver's side, consists of two components (4.1; 4.2). The flap parts (4.1; 4.2) are of the same width as the two parts of the floor assembly (1.1; 1.2) and are adhesively bonded together at the center, so that they are foldable. This flap is adhesively bonded to the floor assembly transversely to the longitudinal direction of the vehicle, so that it can be swung down onto the floor assembly. The flap parts (4.1; 4.2) are also connected at the sides to the side wings (5.1; 5.2) and at the top to the upper wings (5.3; 5.4). The wings can be swung together on the flap. The wings are flexibly connected to the tunnel by means of adhesive tapes or comparable techniques.

The aperture of the tunnel for loading the vehicle is closed by a two-part flap (4.3; 4.4) similar to the flap at the front of the tunnel, with the difference that it does not need to possess any wings. The connection between this flap and the tunnel, depending on requirements, may be fixed or flexible in form, so that if necessary the flap can be removed and resecured after loading of the vehicle.

Figure 7:
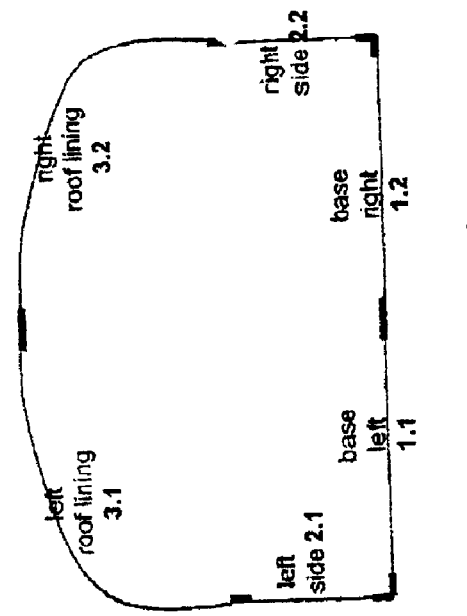
FIG. 7 is a schematic representation showing unfolding of the second embodiment.
Figure 9:
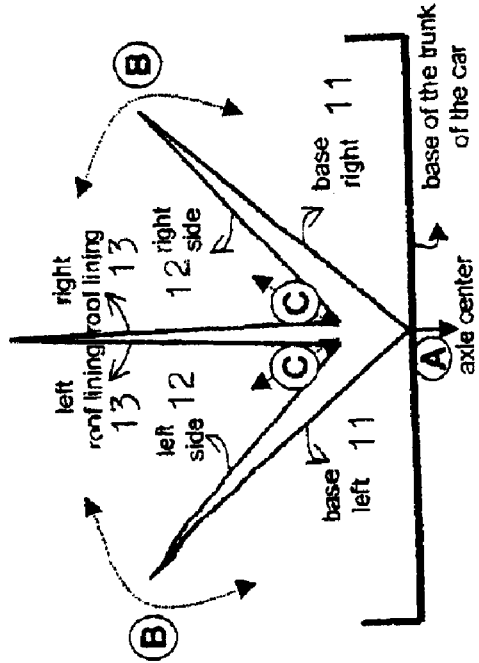
FIG. 9 is a view showing the tunnel portion with flaps and wings.
Figure 8:
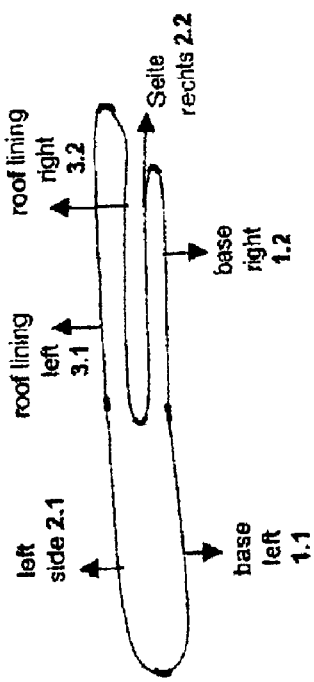
FIG. 8 is an end view showing the tunnel portion of the invention without flap and wing.
Figure 10:
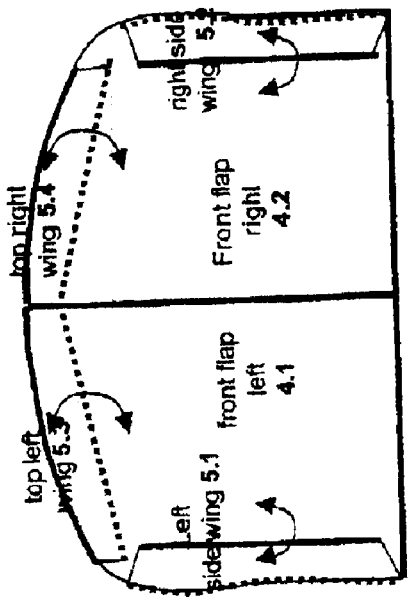
FIG. 10 is an end folded view showing structure of the container only.

Moving the container into the position of use: The folded-together container is laid with the central axis of the floor assembly on the central axis of the floor of the load space (FIG. 7, A) and swung open (B). From the inside, the right-hand and left-hand side and mounting part are pressed outward at the common edge C, so that they press upon the interior walls or covers of the vehicle. After this operation has been performed, a tunnel is formed in the interior space of the vehicle (FIG. 8). The two-part front flap with the side and upper wings, which still lie on the floor assembly, is swung up. The side and upper wings are swung up and secured to the tunnel (FIG. 9). The container is now erected and the vehicle is ready to be loaded. After completion of the loading operation, the front flap is swung up and the container is closed.

Dismantling the container: The procedure for dismantling the container is the exact reverse of the procedure for erecting it.

What is claimed is:

1. A resilient container for the conversion of the interior space of a vehicle for the transportation of goods, comprising:
    a resilient liner having at least a base and two side parts which can be folded up, the side parts being approximately perpendicular to the base in the use position of the liner,
    a resilient roof lining connected to the two side parts,
    the side parts and the roof lining pressed against the interior contours of the vehicle in the use position of the liner, by utilizing the resilience of the liner material.

2. The resilient container of claim 1, wherein, the liner consists of components that can be dismantled.

3. The resilient container of claim 1, wherein, the liner consists of permanently assembled subcomponents, joined at permanent fold lines, the permanent fold lines provided by connecting at a common edge two independent subcomponents, the connection being one member selected from the group consisting of:
    adhesive tape, hot-melt adhesive tape, combinations thereof.

4. The resilient container of claim 1, wherein, the liner consists of one first integral part comprising a plurality of subcomponents defined by fold lines, the subcomponents including the base and the two side parts, the first integral part can be folded together and removed from the vehicle, and a second integral part including the roof lining.

5. The resilient container of claim 1, wherein, the liner material consists of film-laminated foam.

6. The resilient container of claim 1, wherein, the liner consists of at least two components which are connected to one another.

7. The resilient container of claim 1, wherein, a first principal component comprises a base, two side parts, a front flap and a rear flap.

8. The resilient container of claim 7, wherein, a second principal component comprises a roof lining with adjoining side parts.

9. A self supporting container for the conversion of the interior space of a vehicle for the transportation of goods, comprising:
    a resilient liner having at least a base part and two side parts which can be folded up, the side parts being approximately perpendicular to the base part in the use position of the liner,
    a resilient roof lining part connected to the two side parts,
    the appropriate kinematics and mechanics of the folded parts pressing the resilient side parts and the resilient roof lining against the interior contours of the vehicle in the use position of the container.

10. A rigid container for the conversion of the interior space of a vehicle for the transportation of goods, comprising:
    a rigid liner having at least a base and two side parts which can be folded up, the side parts being approximately perpendicular to the base in the use position of the liner,
    a rigid roof lining connected to the two side parts,
    the side parts and the roof lining pressed against the interior contours of the vehicle in the use position of the liner, by utilizing the rigidity of the liner material.

\* \* \* \* \*